(No Model.) 2 Sheets—Sheet 1.

J. C. McCANDLESS & O. KING.
CULTIVATOR.

No. 352,703. Patented Nov. 16, 1886.

WITNESSES:
Chas. Nida
C. Sedgwick

INVENTOR:
J. C. McCandless
O. King
BY Munn & Co
ATTORNEYS.

(No Model.) 2 Sheets—Sheet 2.

J. C. McCANDLESS & O. KING.
CULTIVATOR.

No. 352,703. Patented Nov. 16, 1886.

WITNESSES:
Chas. Nida
C. Sedgwick

INVENTOR:
J. C. McCandless
O. King
BY Munn & Co.
ATTORNEYS.

UNITED STATES PATENT OFFICE.

JOHN C. McCANDLESS AND ORSON KING, OF RANDOLPH, KANSAS.

CULTIVATOR.

SPECIFICATION forming part of Letters Patent No. 352,703, dated November 16, 1886.

Application filed March 17, 1886. Serial No. 195,529. (No model.)

*To all whom it may concern:*

Be it known that we, JOHN C. McCANDLESS and ORSON KING, both of Randolph, in the county of Riley and State of Kansas, have invented a new and useful Improvement in Cultivators, of which the following is a full, clear, and exact description.

Reference is to be had to the accompanying drawings, forming a part of this specification, in which similar letters of reference indicate corresponding parts in all the figures.

Figure 1:
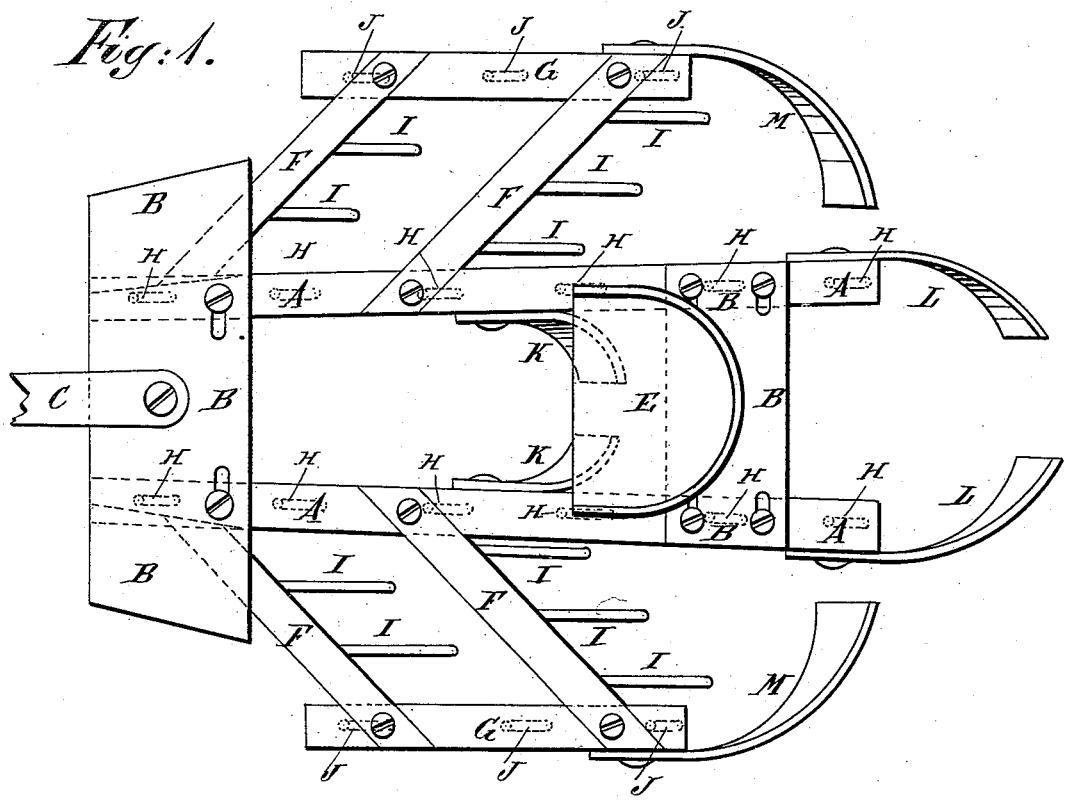
Figure 2:
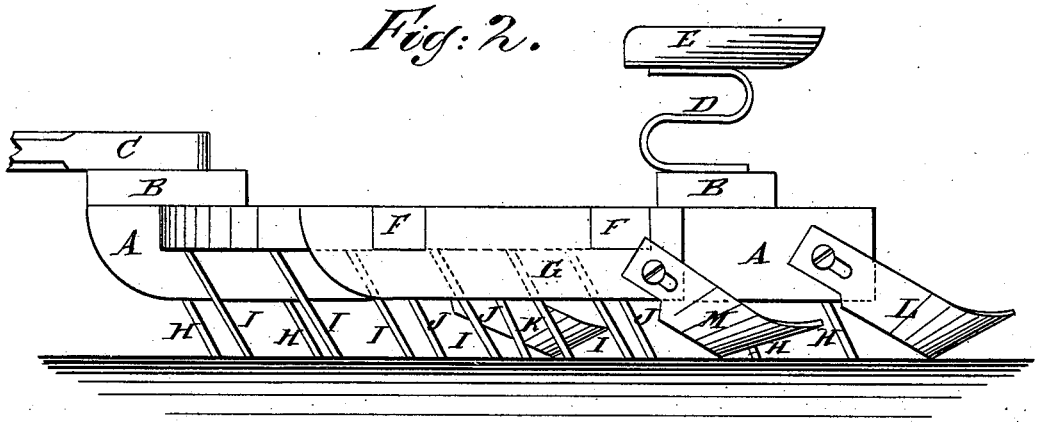
Figure 3:
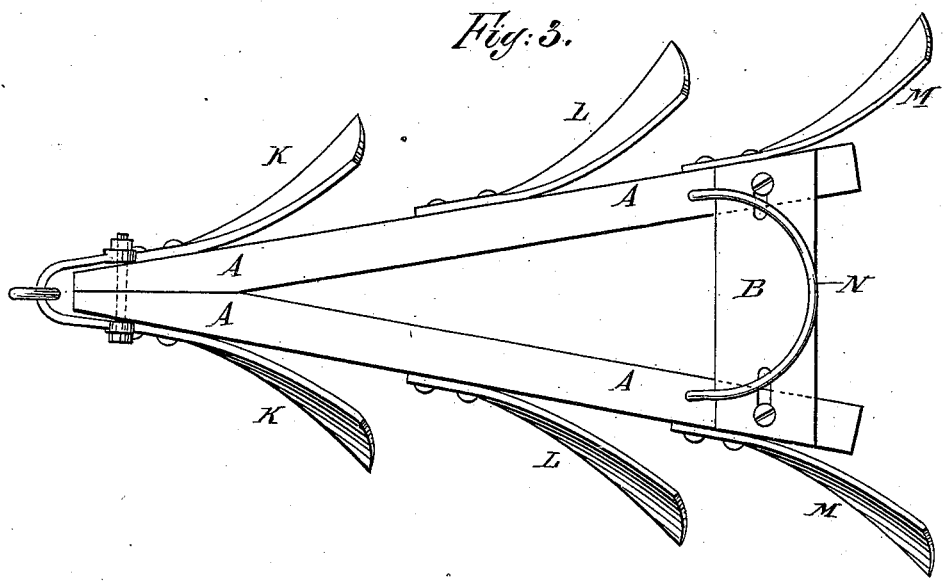
Figure 4:
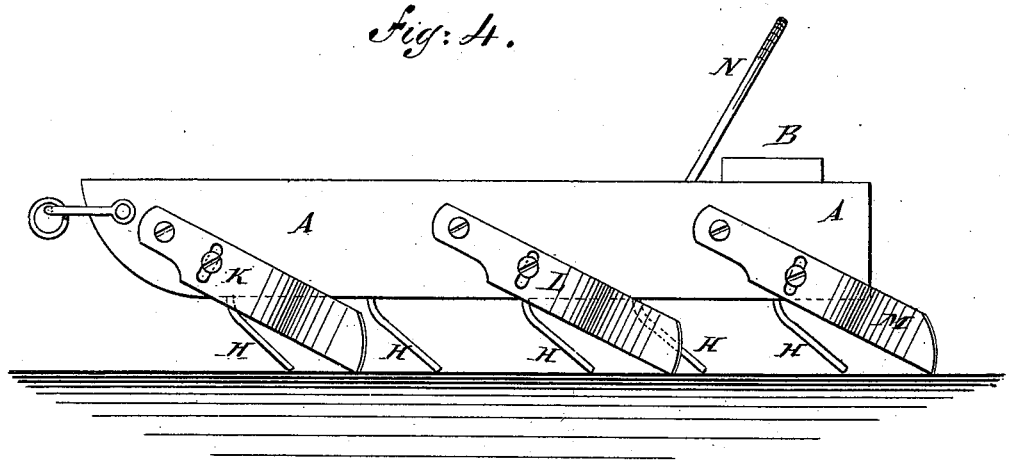

Figure 1 is a plan view of our improved cultivator. Fig. 2 is a side elevation of the same. Fig. 3 is a plan view of the cultivator adjusted to pass between the rows of plants. Fig. 4 is a side elevation of the same.

The object of this invention is to improve the construction of the cultivators for listed corn for which Letters Patent No. 330,143 were issued to us November 10, 1885, in such a manner as to adapt them for use in cultivating all kinds of plants planted in rows or drills upon the surface of the soil.

The invention consists in the construction and combination of various parts of the cultivator, as will be hereinafter fully described.

A represents two runners, which are connected and held in a vertical position by two or more cross-bars, B, bolted to their upper edges, and which are slotted to receive the fastening-bolts, so that the runners A can be adjusted at different distances apart, as the plants to be cultivated may require.

The draft chain or bar C is attached to the forward cross-bar B, and the spring-standard D of the driver's seat E is attached to the intermediate or rear cross-bar B.

To the upper edges of the forward and middle parts of the runners A are attached the inner ends of cross-bars F, two to each. The bars F incline to the rearward at an angle of about forty-five degrees, (45°,) and their outer ends are attached to the upper edges of two runners, G, placed parallel with the runners A.

To the lower edges of the runners A are attached pins H, which project about three and a half inches, and incline to the rearward at an angle of about sixty degrees, (60°.)

To the lower sides of the inclined bars F are attached pins I, and to the lower edges of the runners G are attached pins J. The pins I J incline to the rearward at an angle of about sixty degrees, and are made of such a length that their lower ends will be about upon a level with the lower ends of the pins H.

To the inner sides of the middle parts and the outer sides of the rear ends of the runners A are attached knives K L, which incline to the rearward, are curved inward, and are made with a forward pitch, so as to run beneath the surface of the soil, destroy the weeds, and draw the loose soil to and around the stems of the plants, the inner ends of the said knives being at such a distance apart as to pass along the opposite sides of the row of plants. To the outer sides of the rear ends of the side runners, G, are attached knives M, which incline to the rearward, are curved inward, and are made with a forward pitch, so as to run beneath the surface of the soil, destroy the weeds, and draw the loose soil toward the runners A, the inner ends of the said knives being near the outer sides of the said runners A. The knives K L M are slotted to receive the fastening-bolts, so that they can be adjusted to work deeper or shallower in the ground, as may be required.

When the plants become too tall for the cultivator to pass over them, the inclined bars F, the outer runners, G, and the cross-bars B are detached, and the three pairs of knives K L M are secured to the inner sides of the runners A. The runners A are then changed and are arranged with their forward ends meeting at an angle, and the said forward ends are secured to each other by one or more bolts. The outer sides of the forward ends of the runners A are beveled, as indicated in dotted lines in Fig. 1, and shown in full lines in Fig. 3, so that when the said runners are reversed and are secured to each other their forward ends will form a firm close joint. The rear ends of the diverging runners A are connected by the slotted cross-bar B, so that the said rear ends can be readily adjusted at a greater or less distance apart, as the space between the rows of plants may require.

To the runners A can be attached an arched or other shaped handle, N, for convenience in guiding and controlling the cultivator.

With this arrangement the teeth H will loosen and pulverize the soil in the space between the rows of plants, and the knives K L M will destroy the weeds in the said space and gradually move the soil toward the plants, the rear knives, M, throwing the soil around the stalks of the plants without injuring the lateral rootlets.

Having thus fully described our invention, we claim as new and desire to secure by Letters Patent—

1. The combination, with the runners A, connected by cross-bars B, and having pins H and knives K L, of the rearwardly-inclined bars F, having pins I, and the side runners, G, having pins J, and provided with knives M at their rear ends, substantially as herein shown and described, whereby the soil will be loosened and the weeds destroyed upon the opposite sides of a row of plants, as set forth.

2. In a cultivator, the combination, with the runners A, having beveled forward end, and having rearwardly-inclined pins H attached to their lower edges, of the pairs of knives K L M, curved outward and having their lower edges set forward, and the slotted cross-bar B, substantially as herein shown and described, whereby the said cultivator can be used between rows of plants, as set forth.

JOHN C. McCANDLESS.
ORSON KING.

Witnesses:
BENJ. MAYFIELD,
FRANK T. WALK.